US007929044B2

(12) United States Patent
Chen et al.

(10) Patent No.: US 7,929,044 B2
(45) Date of Patent: Apr. 19, 2011

(54) AUTOFOCUS SEARCHING METHOD

(75) Inventors: Jin-Liang Chen, Hualien County (TW); Chung Chu Chang, Taipei (TW); Chi Hong Tung, Taoyuan County (TW)

(73) Assignee: Industrial Technology Research Institute, Hsinchu County (TW)

( * ) Notice: Subject to any disclaimer, the term of this patent is extended or adjusted under 35 U.S.C. 154(b) by 796 days.

(21) Appl. No.: 11/955,215

(22) Filed: Dec. 12, 2007

(65) Prior Publication Data

US 2008/0151097 A1 Jun. 26, 2008

(30) Foreign Application Priority Data

Dec. 22, 2006 (TW) ............................... 95148354 A

(51) Int. Cl.
*H04N 5/232* (2006.01)
*G03B 17/00* (2006.01)
(52) U.S. Cl. ........ 348/349; 348/345; 348/353; 348/356; 396/79; 396/82
(58) Field of Classification Search ............. 348/345, 348/349, 353, 356; 396/82, 79
See application file for complete search history.

(56) References Cited

U.S. PATENT DOCUMENTS

| 5,208,451 | A | 5/1993 | Deck | |
|---|---|---|---|---|
| 6,430,368 | B1 * | 8/2002 | Hata | 396/79 |
| 7,480,452 | B2 * | 1/2009 | Matsumoto | 396/82 |
| 7,616,876 | B2 * | 11/2009 | Okawara | 396/82 |
| 2003/0223009 | A1 * | 12/2003 | Yoshida et al. | 348/349 |

FOREIGN PATENT DOCUMENTS

| TW | 486599 | 5/2002 |
|---|---|---|
| TW | 571583 | 1/2004 |

* cited by examiner

*Primary Examiner* — David L Ometz
*Assistant Examiner* — Quang V Le
(74) *Attorney, Agent, or Firm* — WPAT, P.C.; Anthony King

(57) ABSTRACT

An autofocus searching method includes the following procedures. First, focus values of images, which are acquired during the movement of the object lens, are calculated, in which the focus value includes at least the intensity value of the image derived from the intensities of the pixels of the image. Next, focus searching is based on a first focus-searching step constant and a first focus-searching direction, in which the first focus-searching step constant is a function, e.g., the multiplication, of the focus value and a focus-searching step size. If the focus searching position moves across a peak of the focus values, it is then amended to be based on a second focus-searching direction and a second focus-searching step constant, in which the second focus-searching step constant is smaller than the first focus-searching step constant, and the second focus-searching direction is opposite to the first focus-searching direction.

15 Claims, 6 Drawing Sheets

AUTOFOCUS SEARCHING METHOD

BACKGROUND OF THE INVENTION (A) Field of the Invention

The present invention relates to a searching method. More particularly, the present invention relates to an autofocus searching method.

(B) Description of the Related Art

Recently, in the automatic optical inspection technology, fast autofocusing is one of the important steps in the optical measurement and inspection method. During the process of fabricating or inspecting the product, the use of fast image inspection methods has become mainstream, and in order to correctly inspect features of the product, it is necessary to obtain an image with high definition. The speed of manual inspection is relatively low, and the accuracy of inspection is easily influenced by human errors, so the reliability of the inspection is influenced also. Therefore, in order to achieve the objective of automatic optical inspection, it is desirable to obtain an autofocus algorithm in support of the optical image inspection method.

With the continuing development of semiconductor fabricating process, system miniaturization technology, and nanometer technology, the inspection equipment industry moves toward a combination of photoelectric technology and automation technology. In the field of miniaturization inspection, these new inspection technologies mostly utilize the non-destructive microscopic object lens method of optical inspection, which not only achieves quick inspection at the miniaturization level, but also further improves the degree of automation of the inspection procedure, combined with signal processing technology.

However, most optical microscopes commercially available on the market use manual focusing. For example, a target mark is added into the optical path as a focusing reference for the image embedment, such that the efficiency of the manual focusing is increased. However, the method is still affected by the quality of the operator, such that the quality of repeated accuracy may be inconsistent.

In order to achieve the objective of automatic optical inspection, the automatic focusing function is required. Inspection equipment with automatic focusing currently available on the market usually need to manually set a limited scope, and then the automatic focusing is performed within the limited scope, such that the efficiency of the automatic inspection equipment is greatly reduced. For example, for two-dimensional coordinate measuring machines commonly used in the industry, the focus searching method is to search for the focus step by step based on the fixed step size of the reference focal depth, and as the object lens moves away from the object to be inspected, longer times are needed for the focus searching.

In automatic focusing technology, the choice of focus searching process is a crucial factor that influences the automatic focusing speed. Focus searching processes can be divided into two categories, namely, stepwise focus searching and variable step focus searching. Stepwise focus searching has the lowest efficiency. Many autofocus processes employ the variable step method to reduce the searching steps and the searching time. However, searching is based on a single image index, such that the reference information of the variable step during the searching is very limited, and the achieved searching performance is also limited.

In Taiwan Patent Publication No. 5208451, a single point sensor is used to detect a position where the intensity of the light interference signal is maximal to serve as the optimal focus point. However, the hardware cost is relatively high, and point inspection is easily affected by noise and other environmental factors, such that the stability is not as desired. In Taiwan Patent Publication No. 486599, a two-stage process, including rough adjustment and fine adjustment, is used for focus searching. Although three evaluation values of images are taken into account, the step sizes are fixed for both rough adjustment and fine adjustment, so that it cannot quickly depart from the region far away from the focusing point. In addition, in Taiwan Patent Publication No. 571583, the focal depth is used as the reference for the focus-searching step, and it is necessary to set a focus searching range. This method cannot increase the searching speed through a large step manner, and autofocusing can only be performed in a short travel range.

The conventional focus searching method is limited to achieving a desirable searching effect close to the focal depth. When this method is applied to long travel focusing or to an object to be inspected that is far away from the focal depth, the value of focal depth must be used as the reference for the focus-searching step, and searching is performed to approach the object step-by-step, so as to avoid omitting images of good definition or colliding with the object. Because the focal depth varies according to the type and the magnification of the object lens, object lenses with shorter focal depth need longer times for focus searching, the efficiency of the automatic optical inspection equipment cannot be increased.

As to the microscopic object lens inspection method based on images, if the object to be inspected is manually moved to the focus position of the object lens, and if the moving speed is too high for the response of the human eye, it is easy to miss the image of good definition or the range of image interference.

In summary, either for machines currently available on the market or for published patents, focus searching for optical inspection still has shortcomings, and thus is unable to reach optimized efficiency.

SUMMARY OF THE INVENTION

One example consistent with the invention provides an autofocus searching method. The autofocus searching method includes the following steps: A focus value of an image during the movement of an object lens is calculated. The focus value includes at least an intensity value of the image; Focus searching is performed based on a first focus-searching step constant and a first focus-searching direction, in which the first focus-searching step constant is a function of the focus value and the focus-searching step, and the focus value is inversely proportional to the focus-searching step; If the focus-searching moves across a peak of the focus value, the focus searching is based on a second focus-searching direction and a second focus-searching step constant, and the second focus-searching direction is opposite to the first focus-searching direction.

DETAILED DESCRIPTION OF THE INVENTION

The technical features of the present invention are described below in detail with reference to the accompanying drawings.

Figure 1:
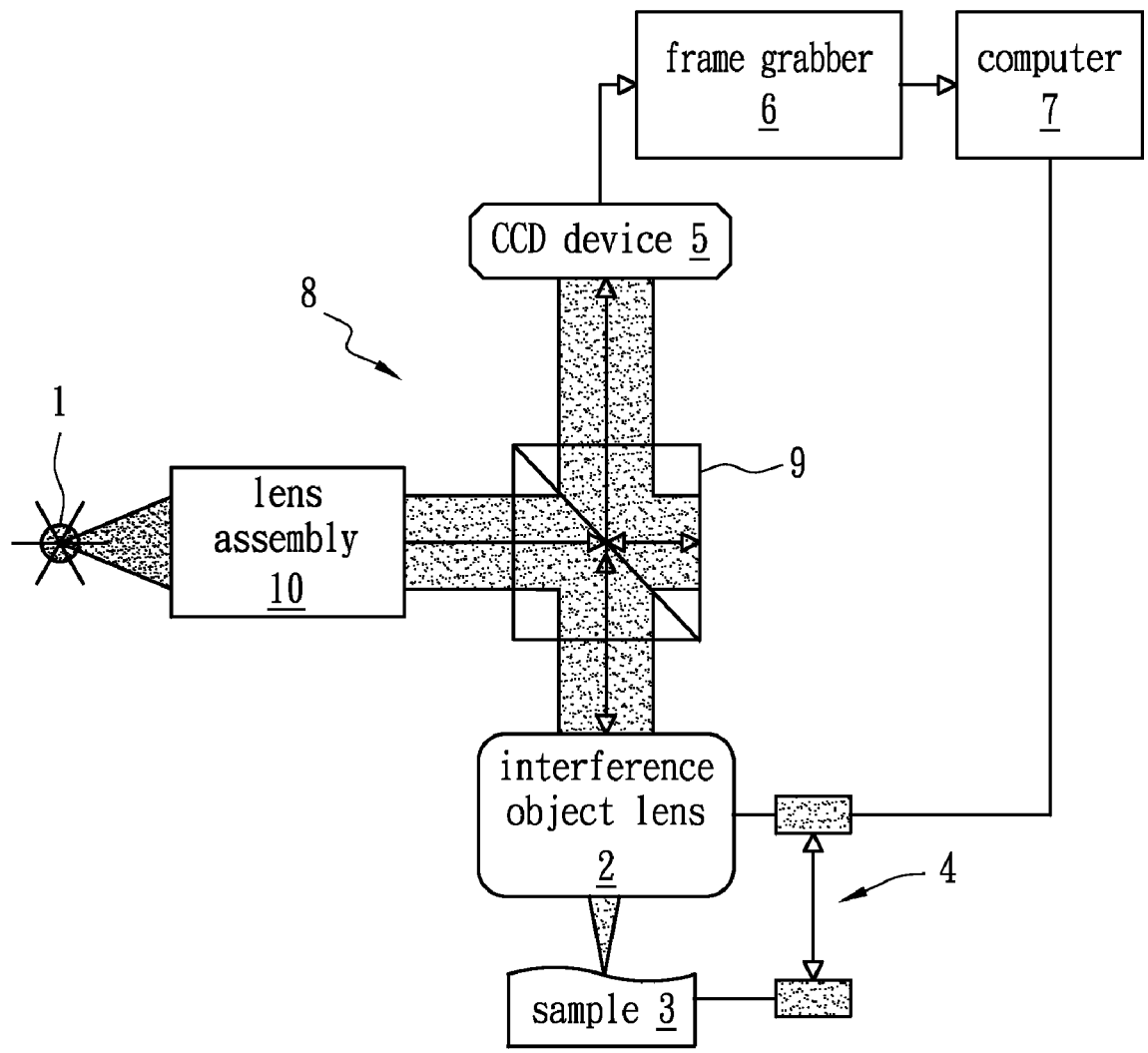
FIG. 1 shows an optical interference microscope system applied in the present invention.

The present invention can be applied in the optical interference microscope system as shown in FIG. 1, which includes a light source 1. The light source 1 may be a white light, a broadband light, or a monochromatic light. When the light passes through an optical system 8 composed of a lens assembly 10 and a beam splitter 9, and enters an interference object lens 2, a part of the light is reflected back to the optical axis of the optical system 8 from a surface of a sample 3, so as to generate the interference. The interference image is captured by a CCD device 5 and a frame grabber 6, and the focus value of the captured interference image is calculated by a computer 7. Through the focus searching method that is capable of self adapting the step size, a focus adjusting apparatus 4 is used to adjust the distance between the object lens 2 and the sample 3 to approach the focus, so as to obtain an interference image with the highest definition.

Figure 2:
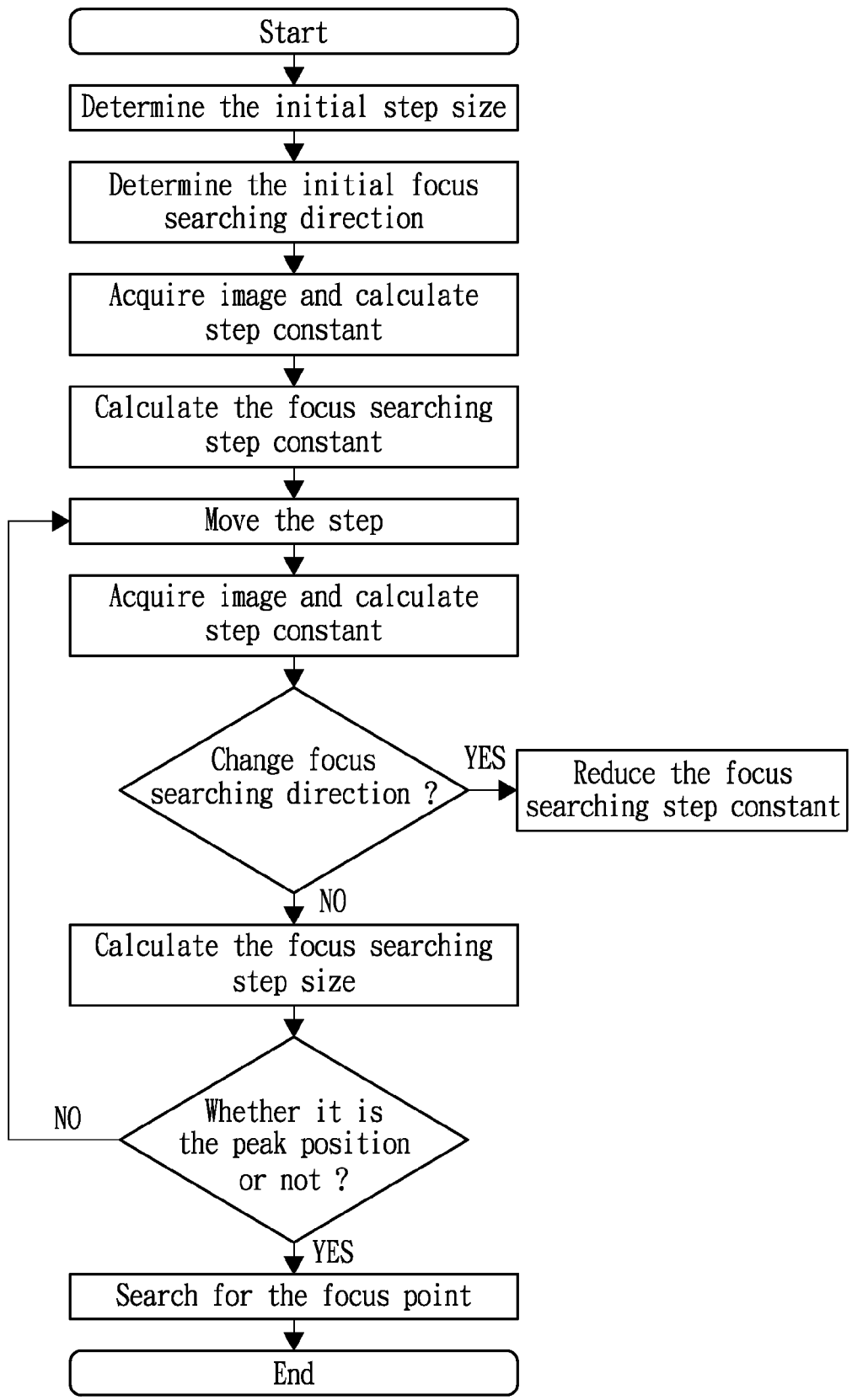
FIG. 2 is a flow chart of an autofocus searching method according to the present invention.

The process flow of calculating the focus value through the computer is shown in FIG. 2. First, the initial step size and the initial focus-searching direction are calculated and determined; then an image is acquired and the focus value and the focus-searching step constant are calculated. Next, the image acquisition cycle of the focus-searching step is performed, in which the focus value is calculated at each focus-searching step, and the next focus-searching step size is calculated, and then the focus-searching direction and the focus are detected and determined. If the focus-searching direction is changed, the value of the focus-searching step constant is reduced, such that the focus-searching step becomes smaller, and much closer to the focus during the focus searching. If the focus position has not been located, the focus searching step is continued; and the focus has been located, the focus searching step is completed, and the autofocusing flow is ended.

In one embodiment of the present invention, a plurality of image evaluation indexes is combined to serve as a focus value, which is used to achieve the long travel fast autofocus, together with a focus index peak searching algorithm and a process of self-adapting focus-searching step size. The methods for calculating the focus value can be Multi-coefficient Correlation, Image Differentiation (such as threshold absolute gradient algorithm or squared gradient algorithm), Gray-scale Depth of Peaks and Valleys (such as image threshold content algorithm or image power algorithm), Image Contrast (such as variance algorithm or normalized variance algorithm), Image Histogram (such as gray-scale range algorithm or gray-scale entropy algorithm), Frequency-domain Analysis (such as Laplacian algorithm), and other effective space frequency methods.

Figure 3:
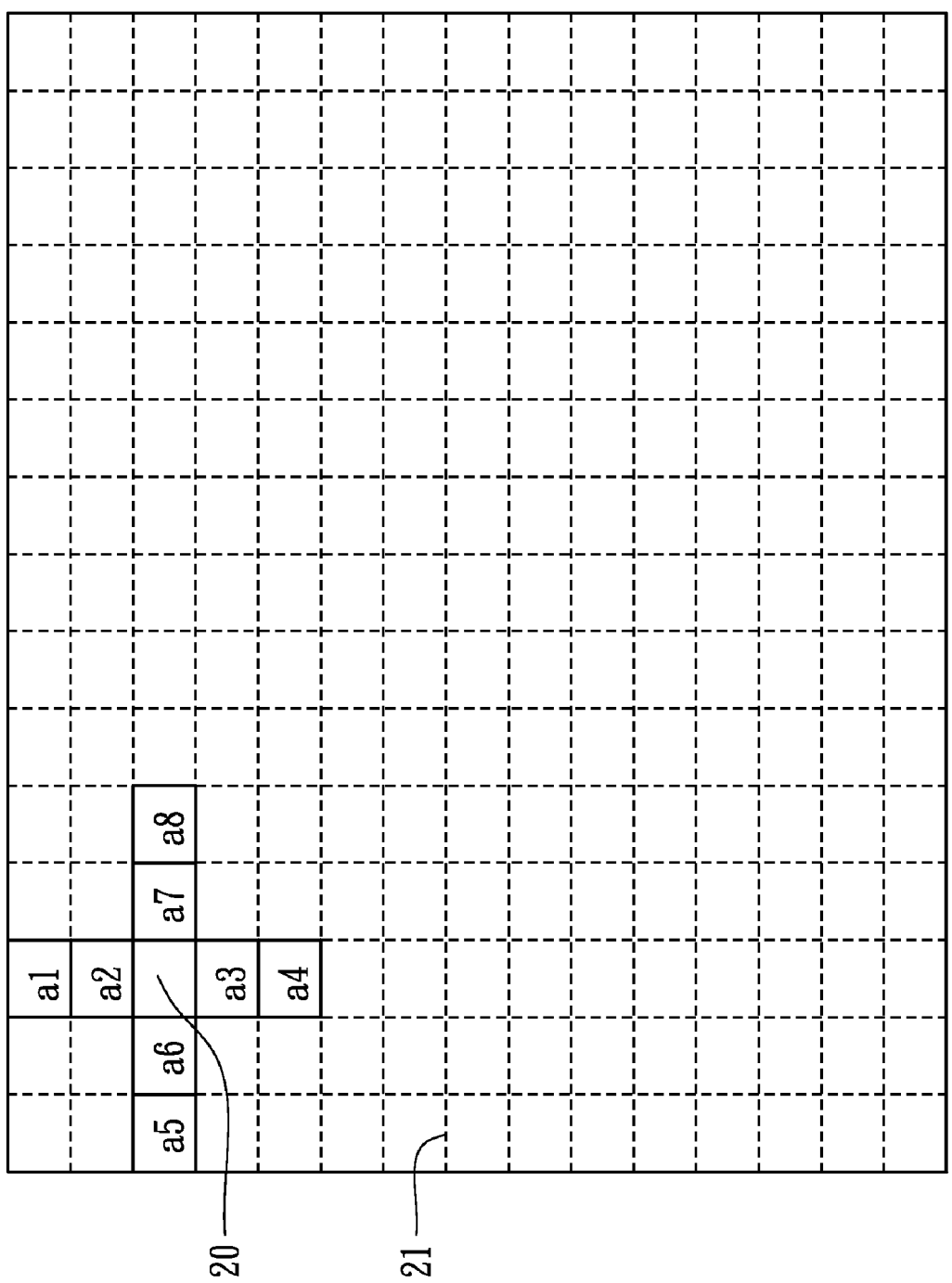
FIGS. 3 to 5 show the process of calculating the focus value of the autofocus searching method according to the present invention.

As shown in FIG. 3, as to the image definition, a cross mask 20 is used to perform a convolution calculation of space differential on the image 21, and the convolution sum is the definition value of the image 21. Particularly, the shape of the mask 20 is symmetric, and weight values a1 to a8 and weight positions are mainly configured. The weight on the mask 20 is multiplied by the pixel value corresponding to each weight position on the image 21 through the convolution process, and after adding the multiplication results, the mask 20 is moved to the next operation position, and the same operation is performed. After the results of all the operations are added together, the definition value of the image 21 is obtained. In addition, the definition value of the image 21 also can be calculated through the image frequency domain analysis.

Figure 4:
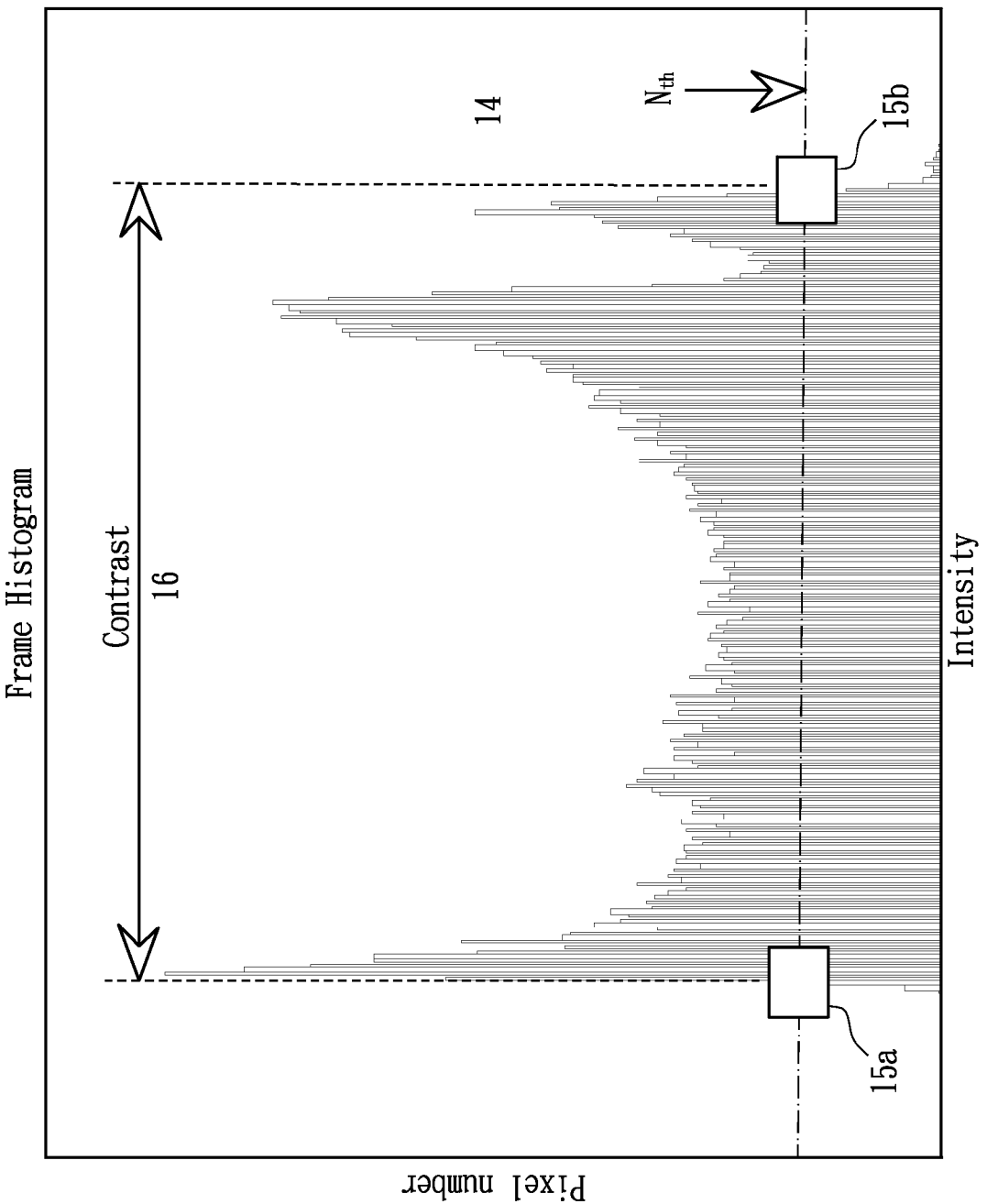

As shown in FIG. 4, as to the image contrast, the distribution width of the intensity count value of the image pixel, i.e., the histogram distribution width 16 of the image (i.e., a distance from the minimum pixel value 15*a* to the maximum pixel value 15*b*, in which a threshold value $N_{th}$ is used to filter out pixel values with pixel number lower than the threshold value $N_{th}$) is taken as the contrast of the image. The intensity value of the image is calculated by the pixel intensity analysis of the image, for example, calculating the sum of the intensity value of each image or the average intensity value between the neighboring pixels in an image region. The intensity value of the image may be the average brightness or the maximum brightness of pixels in the image.

Figure 5:
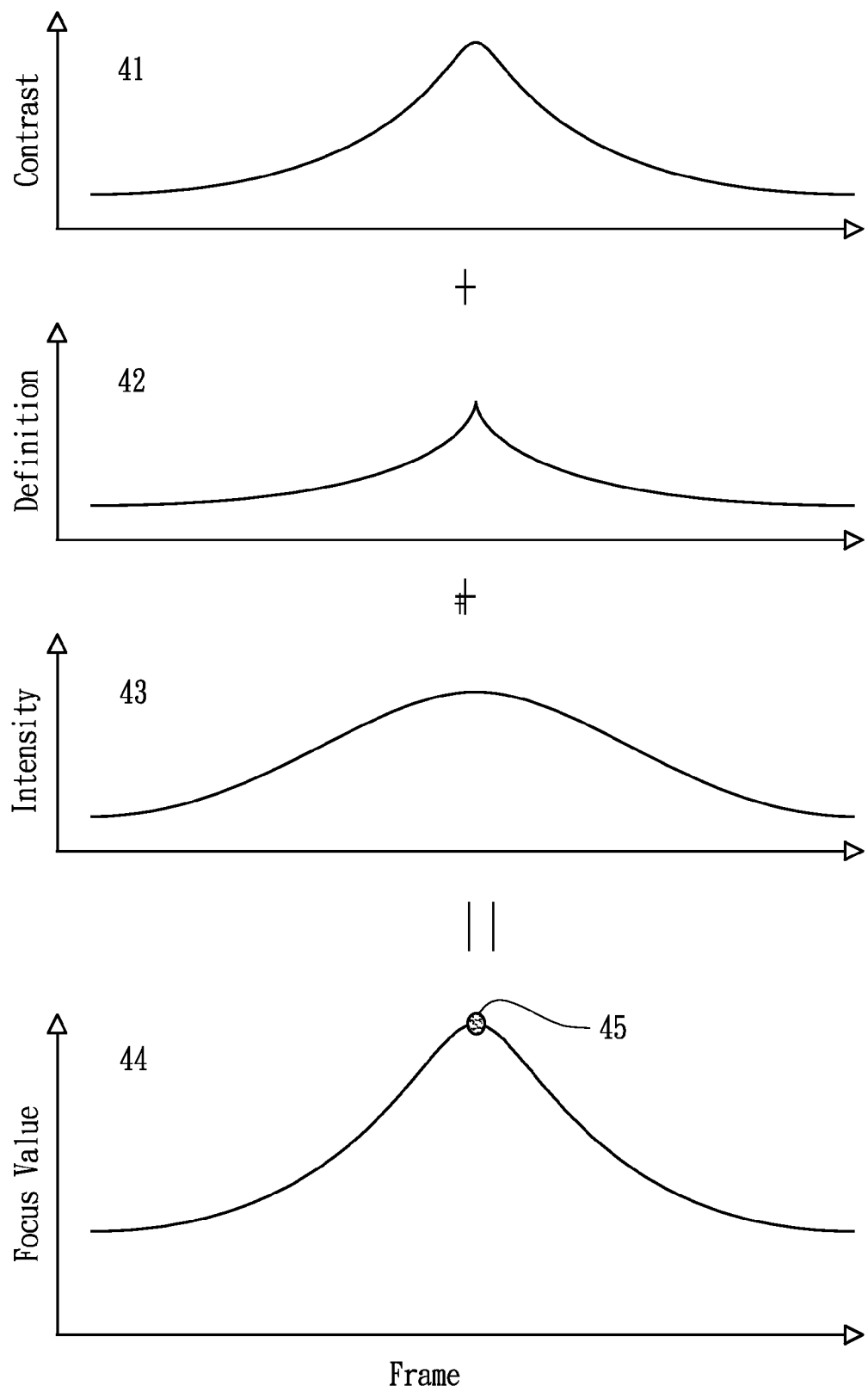

As shown in FIG. 5, during the initializing process, the image contrast 41, the image definition 42, and the image intensity 43 of the image 21 obtained through the above processes are normalized, and are added together to serve as a focus value 44, and the focus position 45 is searched according to the focus value 44.

Figure 6:
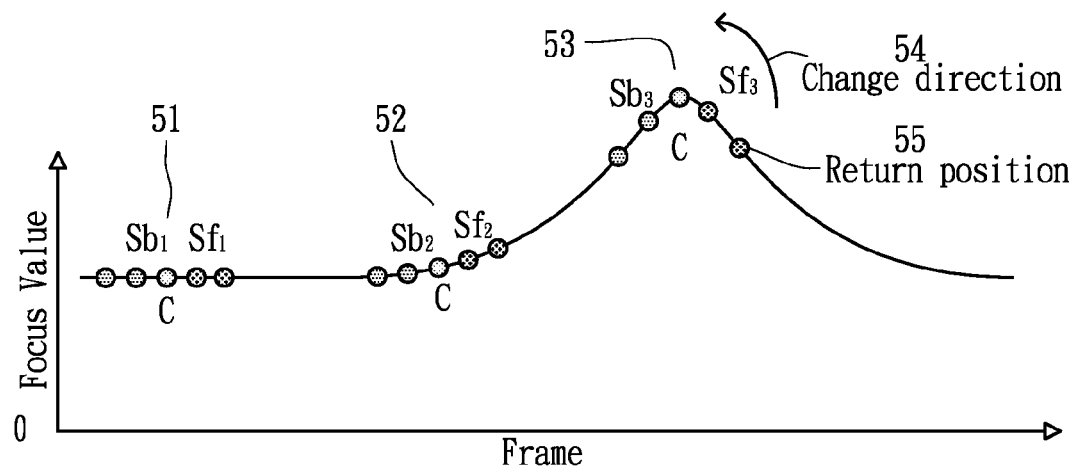
FIGS. 6 to 8 show the autofocus searching method of the present invention.

As shown in FIG. 6, during the focus searching process, the focus index peak searching algorithm is used to determine the focus-searching direction, 5 points (or more than 3 points) of focus values C are recorded, and a forepart slope Sf and a back part slope Sb of a curve formed by the focus values C are calculated. At a position 51 away from the focus, the forepart slope Sf1 and the back part slope Sb1 are almost the same. At a position in a region 52 close to the peak, the forepart slope Sf2 is larger than the back part slope Sb2, and at a position in a region 53 crossing over the peak, the forepart slope Sf3 is smaller than the back part slope Sb3. At this time, the focus-searching direction is changed at an inverse point 55, so as to perform focus searching in opposite direction, and so forth.

Figure 7:
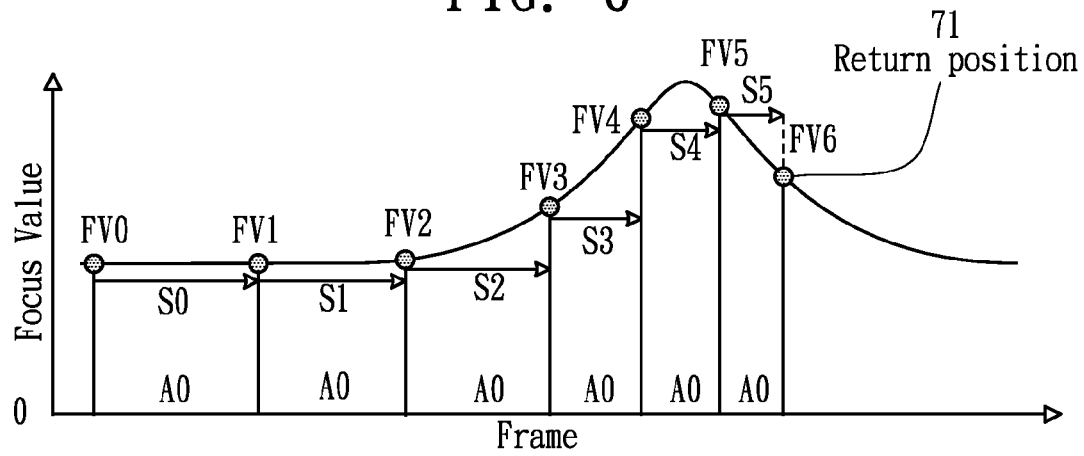
Figure 8:
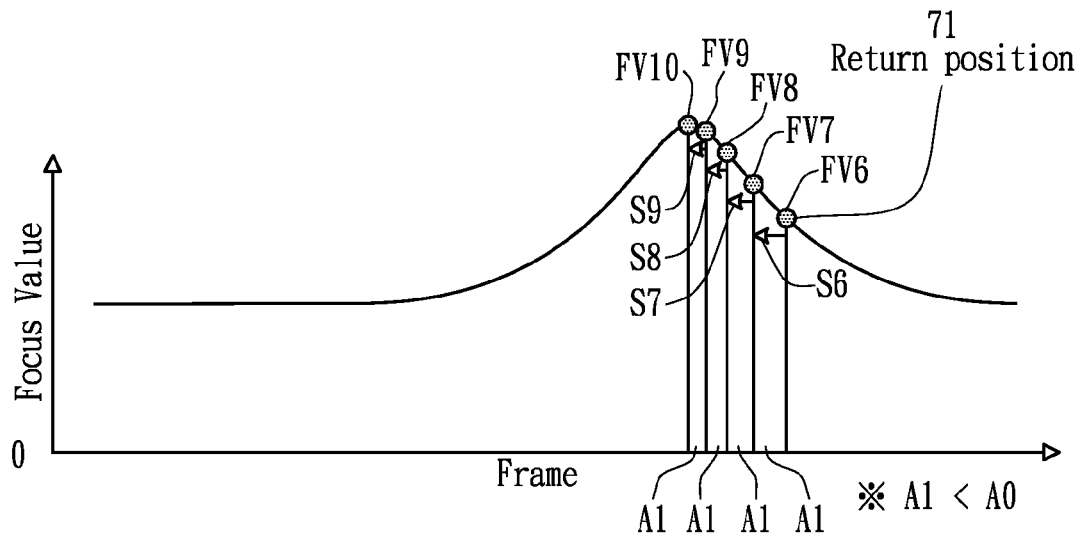

As shown in FIG. 7, in order to increase the focus searching speed and to enlarge the travel range of the autofocusing process, a focus searching method capable of self adapting the step size is used. In the focus index peak searching algorithm, the focus-searching step size is changed according to the focus value. While the focus searching is initialized, the initial focus value FV0 is calculated, and the initial focus-searching step S0 is determined. S0 is not affected by the scope of the focal depth, and reaches up to several hundreds of micrometers in actual applications. Next, the focus-searching step constant A0 is calculated, in which A0=FV0\*S0. After moving a distance of S0, the focus value FV1 is calculated, and the next step S1=A0/FV1 is calculated. The subsequent calculations are analogous to the above example. When the focus searching approaches the peak of the focus value, a higher slope is encountered. At this time, the focus value is increased, such as FV2 to FV5. Because the area of the focus-searching step constant A0 is fixed, the focus-searching step is reduced, such as S2 to S5. Thus, as the focus value moves closer to the peak value, the focus-searching step becomes smaller, and the probability of missing the focus point is reduced. If the focus index peak searching algorithm determines that the focus has been missed, the focus-searching direction is changed, and the focus searching reverses at the inverse point 71. At this time, the focus-searching step constant is changed to A1 simultaneously, and A1<A0. The variation scope of the self-adapting focus-searching step size becomes smaller, such as S6 to S9, such that the focus searching process is finer, as shown in FIG. 8. The focus searching is repeatedly inversed and the variation scope of the focus-searching step is repeatedly reduced; therefore the focus-searching step will eventually converge to the peak (i.e., focus) of the focus value, as the process determines whether the focus-searching step size is smaller than or equal to the minimum step size of the system to obtain the focus position.

Accordingly, in terms of the focus searching, once the focus searching is initialized, an initial focus index and an initial step size are taken into consideration, and the multiplication of the two values is selected as a focus-searching step constant, and the next focus-searching step size is determined based on the current focus-searching step constant and calculated focus index for each step. This method is applicable for performing the focus searching with the long travel focus-searching step at the beginning of the focus searching. In addition, one embodiment of the present invention is helpful for searching not only correct focus images but also images with high contrast through combining a plurality of image indexes. For example, with the interference fringe image, it can be applied on common optical inspection instruments and image inspection (measurement) equipment such as the white-light interferometer.

The autofocus searching method of one embodiment of the present invention can enlarge the travel range for autofocusing and increase the speed of long travel focusing, and it is not necessary to perform sectional focus searching. During the focus searching process, based on the initial focus-searching step and the initial focusing value, the step size in the focus searching process is self adapted, and then converged to a focus position. As the object to be inspected moves away from the focus of the object lens, the larger initial focus-searching step is used to increase the focus searching speed. As the search approaches the focus point, the steps are self-modulated to become smaller, so as to quickly converge to focus and obtain sharp images. For example, when the present invention is applied to an object lens (NA=0.4) with a magnification of 20 and a focal depth of about 3 μm, the initial focus-searching step is up to 250 μm, and exact focusing is achieved.

Referring to FIG. 5 again, the rising amplitude of the waveform of the intensity 43 is greater than that of the waveform of the contrast 41 and the definition 42, and the intensity waveform rises significantly at positions away from the focus (away from the peak). This feature is particularly suitable for long travel focus searching. In a second embodiment of the present invention, if searching is started at a position away from the focus, the intensity is taken as the focus value, and as the object lens approaches the focus point, the contrast, the definition or the combination thereof is added to be included in the focus value, or the contrast, the definition, or the combination thereof is taken as the focus value. As a result, the object lens can quickly approach the focus with large steps, and then approach the focus with small steps, such that the time required for focus searching is greatly reduced, and focus searching efficiency is improved.

Accordingly, in the autofocusing method of one embodiment of the present invention, the focus value is first calculated based on an initial image, and then the initial step size and the focus-searching direction are determined. The initial focus value and the initial step size are multiplied and the resulting value serves as the focus-searching step constant. Then, the focus searching step is started, in which the focus value of the image is calculated at the end of each focus-searching step, and the focus-searching step constant is divided by the focus value of the image, so as to calculate a next focus-searching step size. Then, the focus-searching direction and the focus are detected and determined to figure out whether the focus-searching direction needs to change or not and whether the focus is found or not. If the focus-searching direction needs to be changed, indicating that the focus is located at another direction, the value of the focus-searching step constant is reduced, e.g., half of the original value. Accordingly, the calculated focus-searching step becomes smaller, and when it comes back to search for the focus, it will be much closer to the focus. If the focus is found, the focus searching is completed and the autofocusing is ended.

In practice, the focus-searching step constant of the present invention is not limited to being the multiplication of the focus value and the focus-searching step size. For other functions of the focus value and the focus-searching step, as long as the two factors are inversely proportional to each other, i.e., the focus-searching step is reduced as the focus value increases (e.g., the square root of the multiplication), such functions fall within the scope of the present invention.

The focus value can be image evaluation indexes or the combination thereof, such as the image contrast, the image definition, and the image intensity. During the focus searching process, not only are the focus value and the focus-searching step size calculated, but the focus detection is also performed. The focus index peak searching algorithm is used to determine the focus-searching direction and the focus point. The focus index peak searching algorithm selects a focus value, divides the focus value into a forepart and a back part, and calculates the slopes of the forepart and the back part. When the forepart slope is smaller than that of the back part and exceeds a threshold value, this indicates that the focus-searching direction has to be changed. When the focus-searching direction is changed, the focus-searching step constant is changed to be smaller than the focus-searching step constant of the original direction. At this time, the variation scope of the focus-searching step for self adapting becomes smaller, i.e., a much finer focus searching process is performed. When approaching the peak of the focus value, the focus-searching step is automatically converged to the focus position.

With reference to indexes of image definition, image contrast, image average intensity and the like, the autofocus searching method of the present invention can be applied in interference and non-interference microscope architectures.

In an embodiment of the present invention, in order to accurately and quickly search for the focus, three image evaluation indexes, namely, the image definition, the image contrast, and the image intensity are combined as the focus value. In another embodiment, the image intensity is used as the focus value for positions away from the focus, so as to improve the long travel focusing efficiency.

In one embodiment of the present invention provides a method of quickly searching focus in a focusing process, so as to increase the focusing speed and to solve the problems of manually searching for clear images on the focus. In addition, a focus index is obtained by integrating a plurality of image indexes, so as to effectively determine the searching direction during focus searching. Meanwhile, an adequate step size is determined to improve the method of stepwise searching or the conventional variable step searching process for long travel focus searching, so as to reduce the time required for long travel focus searching, and to improve the autofocusing efficiency.

In addition, a plurality of image indexes are added according to one embodiment of the present invention, and an initial image and an initial searching step are selected as the bases for determination of variable steps during focus searching, so as to greatly increase the focus searching efficiency. The focus searching of one embodiment of the present invention is based on actual images, so as to avoid the problems with the conventional look-up table method in which table information must be changed according to different object lenses.

The focus searching method of one embodiment of the present invention that is capable of self adapting steps utilizes only one rule, that is, from focus searching of long travel steps to fine focus searching of small steps, in which the initial focus-searching step away from the focus reaches up to hundreds of times of the focal depth of the object lens. After the focus-searching step, the focus searching can be quickly converged to the minimum resolution step number of the actuator, and converged to the focus position. The three image evaluation indexes, i.e., the focus indexes of image contrast, image definition, and image intensity or the combination thereof for focus searching, include almost all information of the image. Moreover, in the focus searching process, the focus index peak-searching algorithm is used to effectively determine the focus-searching direction and the focus position, so as to improve the autofocusing reliability.

The above-described embodiments of the present invention are intended to be illustrative only Numerous alternative embodiments may be devised by those skilled in the art without departing from the scope of the following claims.

What is claimed is:

1. An autofocus searching method, comprising:
   calculating a focus value of an image according to each position of an object lens in the movement, wherein the focus value comprises at least an intensity value of the image;
   performing focus searching based on a first focus-searching step constant and a first focus-searching direction, wherein the first focus-searching step constant is a value of a function of the focus value and a focus-searching step size, and the focus value is inversely proportional to the focus-searching step size; and
   performing focus searching based on a second focus-searching direction and a second focus-searching step constant if a focus-searching position moves across a peak of the focus value, wherein the second focus-searching direction is opposite to the first focus-searching direction;
   wherein the focus value further comprises at least a contrast value or a definition value of the image,
   wherein the definition value of the image is calculated by means of a space differential operation of the image or a frequency domain analysis of the image,
   wherein the space differential operation of the definition value of the image comprises:
   (a) providing a mask including weight values and weight positions;
   (b) multiplying the weight on the mask by a pixel value corresponding to the weight position on the image by convolution;
   (c) after adding the multiplication results, moving the mask to the next operation position and performing the operation of the step (b); and
   (d) repeating the steps (b) and (c), and adding all the operation results as the definition value of the image.

2. The autofocus searching method of claim 1, wherein the focus-searching step size gradually decreases during focus-searching.

3. The autofocus searching method of claim 1, wherein the second focus-searching step constant is smaller than the first focus-searching step constant.

4. The autofocus searching method of claim 1, wherein the focus value is a combination of the intensity value, a contrast value, and a definition value of the image.

5. The autofocus searching method of claim 1, wherein the function is a multiplication or a square root of the multiplication.

6. The autofocus searching method of claim 1, wherein if the focus-searching position is far away from the peak of the focus value, the intensity value of the image is used as the focus value.

7. The autofocus searching method of claim 1, wherein if the focus-searching position approaches the peak of the focus value, the focus value comprises at least the contrast value or the definition value of the image.

8. The autofocus searching method of claim 1, wherein the step of performing the focus searching based on a first focus-searching step constant and a first focus-searching direction comprises:
   dividing the first focus-searching step constant by the focus value corresponding to a position where the object lens is located currently as a focus-searching step size for the next movement of the object lens.

9. The autofocus searching method of claim 1, further comprising:
   presetting an initial focus value and an initial focus-searching step size; and
   calculating a value of a function of the initial focus value and the initial focus-searching step size as an initial focus-searching step constant.

10. The autofocus searching method of claim 1, wherein the contrast value of the image is calculated through the pixel intensity distribution in the image.

11. The autofocus searching method of claim 10, wherein the calculation of the contrast value of the image comprises:
    statistically calculating at least a part of the pixel value distribution of the image by means of a histogram; and
    determining the contrast value of the image according to the size of the distribution of the histogram.

12. The autofocus searching method of claim 1, wherein the intensity value of the image is calculated through pixel intensity analysis of the image.

13. The autofocus searching method of claim 1, wherein the intensity value of the image is a maximal brightness value of pixels or an average brightness value of pixels of the image.

14. The autofocus searching method of claim 1, wherein the determination of the focus-searching position comprises:
    selecting a plurality of neighboring focus values;
    dividing a curve formed by the plurality of focus values into a forepart curve and a back part curve according to the first focus-searching direction, and calculating slopes of the forepart curve and the back part curve; and
    indicating that a peak of the focus value is crossed over if the slope of the forepart curve is smaller than that of the back part curve and exceeds a threshold value.

15. The autofocus searching method of claim 14, wherein the number of the plurality of focus values is larger than or equal to 3.

* * * * *